United States Patent [19]

Murofushi

[11] Patent Number: 4,965,438
[45] Date of Patent: Oct. 23, 1990

[54] TICKET ISSUING APPARATUS

[75] Inventor: Harutoshi Murofushi, Shizuoka, Japan

[73] Assignee: Tokyo Electric Co., Ltd., Tokyo, Japan

[21] Appl. No.: 287,404

[22] Filed: Dec. 20, 1988

[30] Foreign Application Priority Data

Dec. 24, 1987 [JP] Japan .................. 62-328105

[51] Int. Cl.$^5$ ............................... G07B 15/02
[52] U.S. Cl. ..................... 235/384; 235/381; 235/385; 235/432; 235/487
[58] Field of Search ............... 235/381, 384, 487, 432, 235/385; 364/407

[56] References Cited

U.S. PATENT DOCUMENTS

3,984,600  10/1976  Oka et al. ......................... 235/384
4,357,530  11/1982  Roes et al. ....................... 235/384
4,359,631  11/1982  Lockwood ......................... 235/381

FOREIGN PATENT DOCUMENTS

60-173671  9/1985  Japan .
61-128369  6/1986  Japan .
62-162188  7/1987  Japan .

Primary Examiner—Harold I. Pitts
Attorney, Agent, or Firm—Frishauf, Holtz, Goodman & Woodward

[57] ABSTRACT

A ticket issuing apparatus includes a feeding path sheets of ticket paper on which magnetic stripes are formed, a feeding mechanism for feeding the ticket paper along the feeding path, a recording section provided on the feeding path for recording ticket data on the magnetic stripe of the ticket paper, a readout section provided on the feeding path for reading out the ticket data from the magnetic stripe of the ticket paper which has passed the recording section, a printing section provided on the feeding path for printing display data on the ticket paper, and a ticket evaluation section for checking the ticket data read out by the readout section. In the ticket issuing apparatus, the ticket evaluation section causes the feeding mechanism to feed the ticket paper back to the recording section when the ticket data recorded for the first time is detected to be erroneously recorded, checks the ticket data which has been recorded again and read out by the readout section, and determines the ticket paper as an ineffective ticket when the ticket data is detected to the erroneously recorded again.

7 Claims, 3 Drawing Sheets

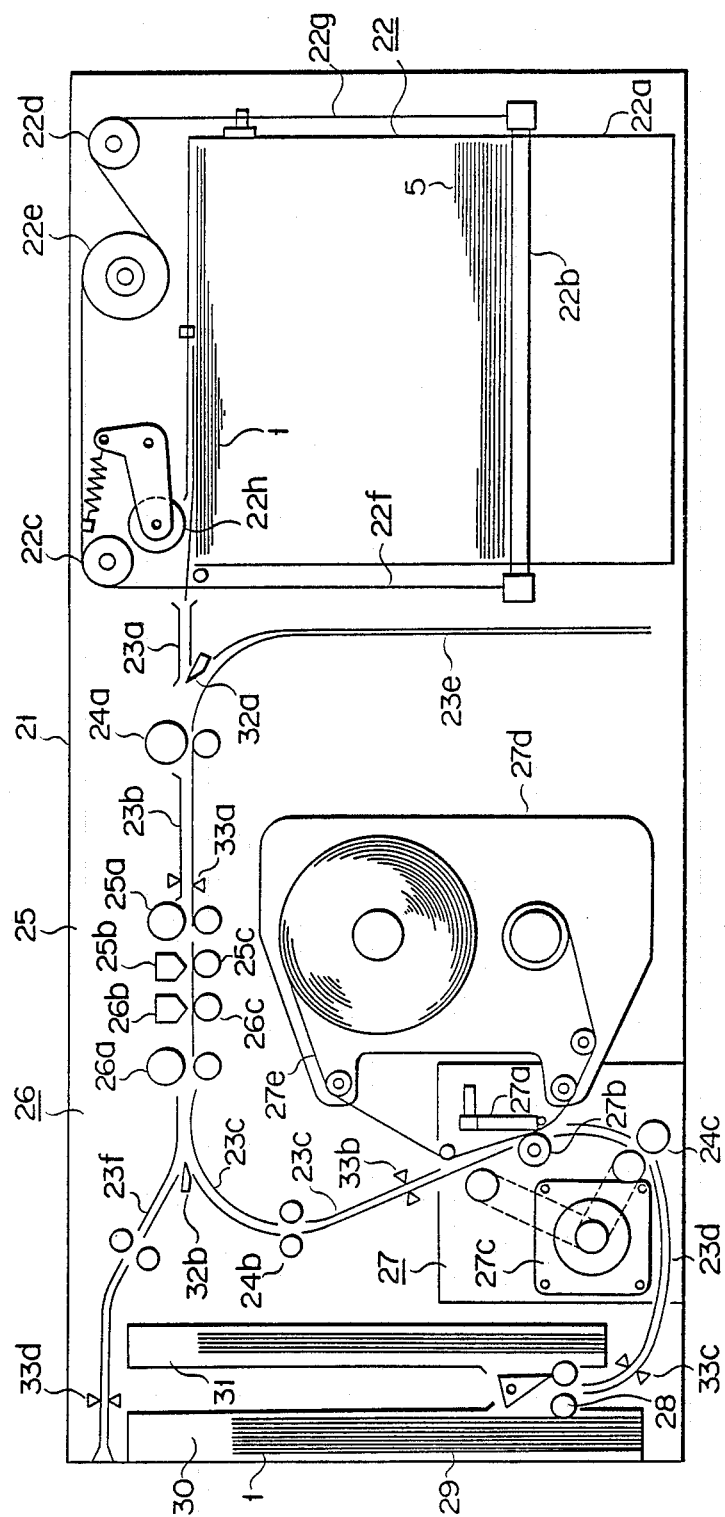
F I G. 2

TICKET ISSUING APPARATUS

BACKGROUND OF THE INVENTION

1. Field of the Invention

This invention relates to a ticket issuing apparatus, and more particularly to a ticket issuing apparatus for issuing tickets each having a magnetic stripe formed thereon.

2. Description of the Related Art

Recently, tickets with magnetic stripes are used in various traffic facilities in order to reduce the labor for the examination of tickets. The ticket is generally issued by preparing a paper card having a magnetic stripe formed on the back side thereof, for example, printing display data including the departure and arrival places, valid data, traffic fee and the like, and then recording service ticket data determined by the display data on the magnetic stripe. When the ticket is inserted into the ticket examination device provided at the ticket gate, the ticket data is read out from the magnetic stripe of the ticket, and it is checked based on the readout ticket data whether the ticket is valid or not. Further, the ticket can be used to count the total number of passengers.

The conventional ticket issuing apparatus is constructed to read out the ticket data recorded on the magnetic stripe of the ticket and determines that the ticket is ineffective when the readout ticket data is detected to be recorded incorrectly. The ineffective ticket is temporarily stored in a storage provided in the ticket issuing apparatus and finally abandoned.

With this type of ticket issuing apparatus, the rate of issuance of ineffective tickets with respect to the total number of ticket issuing operations is relatively high. The paper for the tickets may be wasted, causing an uneconomical result.

SUMMARY OF THE INVENTION

An object of this invention is to provide a ticket issuing apparatus with which the rate of issuance of ineffective tickets can be reduced.

The object can be attained by a ticket issuing apparatus comprising a feeding path for sheets of ticket paper on which magnetic stripes are formed; a feeding mechanism for feeding the ticket paper along the feeding path; a recording section provided on the feeding path for recording ticket data on the magnetic stripe of the ticket paper; a readout section provided on the feeding path for reading out the ticket data from the magnetic stripe of the ticket paper which has passed the recording section; a printing section provided on the feeding path for printing display data on the ticket paper; and a ticket evaluation section for checking the ticket data read out by the readout section, causing the feeding mechanism to feed the ticket paper back to the recording section when the ticket data is detected to be erroneously recorded, checking the ticket data which has been recorded again and read out by the readout section, and determining the ticket paper as an ineffective ticket when the ticket data is detected to be erroneously recorded again.

According to the above ticket issuing apparatus, when the initial recording error is detected, ticket data is recorded again by the recording section. When, for example, the magnetic stripe itself is damaged, ticket data cannot be correctly recorded on the magnetic stripe even if the recording operation is repeatedly effected. However, in a case where the recording error has occurred by chance, correct ticket data can probably be recorded on the magnetic stripe if the recording operation is effected again. When the correct data is recorded on the magnetic stripe by the re-recording operation, the ticket paper will not be determined as an ineffective ticket. Therefore, the rate of the issuance of ineffective tickets with respect to the total number of ticket issuing operations can be suppressed to a minimum.

BRIEF DESCRIPTION OF THE DRAWINGS

FIG. 2 shows the internal structure of a ticket issuing apparatus according to one embodiment of this invention;

DETAILED DESCRIPTION OF THE PREFERRED EMBODIMENTS

There will now be described a ticket issuing apparatus according to one embodiment of this invention with reference to FIGS. 1A to 5.

Figure 1A:
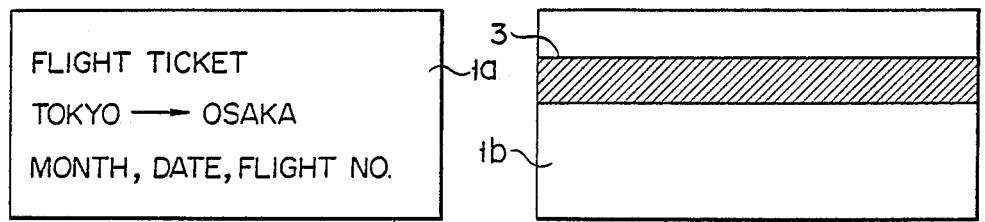
FIGS. 1A and 1B show the front and back surfaces of a typical ticket with a magnetic stripe.
Figure 1B:
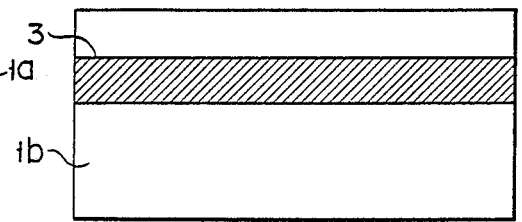

FIGS. 1A and 1B show the front and back surfaces of a ticket which is issued as a boarding pass from a ticket issuing apparatus. The ticket has magnetic stripe 3 formed on the back surface 1b of ticket paper 1. Display data such as departure and arrival places, boarding date and flight number is printed on the front surface 1a of ticket paper 1 and service ticket data determined according to the display data is recorded on magnetic stripe 3.

FIG. 2 shows the internal structure of the ticket issuing apparatus. In the ticket issuing apparatus, storage 22 for storing a plurality of sheets of paper 1 on each of which magnetic stripe 3 is formed is disposed in casing 21. In storage 22, paper holding plate 22b is mounted in a casing 22a so as to be vertically movable. Wires 22f and 22g are connected at one end to paper holding plate 22b and connected at the other end to take-up roller 22e via respective pulleys 22c and 22d. Feed-out roller 22h is disposed on a paper outlet port formed on casing 22a. When take-up roller 22e is rotated, paper holding plate 22b is lifted and sheets of paper 1 are extracted one by one from the top by means of feed-out roller 22h. Sheets of paper 1 are set in casing 22a with back surface 1b on which magnetic stripe 3 is formed facing upwardly.

The extracted paper is fed to feed roller 24a via guide 23a constituting the feeding path. Feed roller 24a feeds the received paper to data recording section 25 via guide 23b.

As shown in FIG. 2, data recording section 25 is constituted by paper feeding roller 25a, magnetic head 25b and paper pressing shafts 25c. While paper 1 is being fed by means of paper feeding roller 25a, ticket data is recorded on magnetic stripe 3 of paper 1 by means of magnetic head 25b.

After ticket data has been recorded by means of data recording section 25, paper 1 is fed to data readout section 26 constituted by paper feeding roller 26a, magnetic head 26b and pressing shafts 26c. In the data readout section, ticket data is read out from magnetic stripe 3 by means of magnetic head 26b while paper 1 is being fed by paper feeding roller 26a. Paper 1 is further fed to printing section 27 via feed roller 24b by means of paper guide 23c.

As shown in FIG. 2, printing section 27 includes thermal head 27a for printing display data on front surface 1a of paper 1, platen roller 27b, motor 27c for driving platen roller 27b, printing ribbon 27e set inside cassette 27d. Display data is printed on paper 1 by means of printing section 27, and then the paper is guided to feed-in roller 28 via feed roller 24c by means of guide 23d.

Switching lever 29 is disposed on the outlet side of feed-in roller 28, and normal ticket stacking chamber 30 and ineffective ticket stacking chamber 31 are disposed on both sides of switching lever 29 with the paper inlet ports thereof facing switching lever 29. When switching lever 29 is rotated in a clockwise direction, paper 1 is stacked in normal ticket stacking chamber 30. In contrast, when switching lever 29 is rotated in a counterclockwise direction, paper 1 is stacked in ineffective ticket stacking chamber 31.

Guide 23e is formed between feed roller 24 and storage 22. Guide 23e is used to receive part of paper 1 when paper 1 is fed back from guide 23b while it is being held by roller 24a. Guide 23f for guiding paper 1 which has been inserted by hand to recording section 25 is arranged in the upper portion of casing 21. Switching levers 32a and 32b for determining the feeding direction of paper 1 are mounted on a connection portion of guides 23a and 23e and a connection portion of guides 23c and 23f, respectively.

Further, paper sensors 33a, 33b, 33c and 33d for sensing paper 1 are respectively mounted on guides 23b, 23c, 23d and 23f.

Feed rollers 24a, 24b and paper feeding motors 25a, 25b are used as a feeding mechanism for feeding paper 1 along a feeding path constituted by guides 23a, 23b, 23c and 23e.

Figure 3:
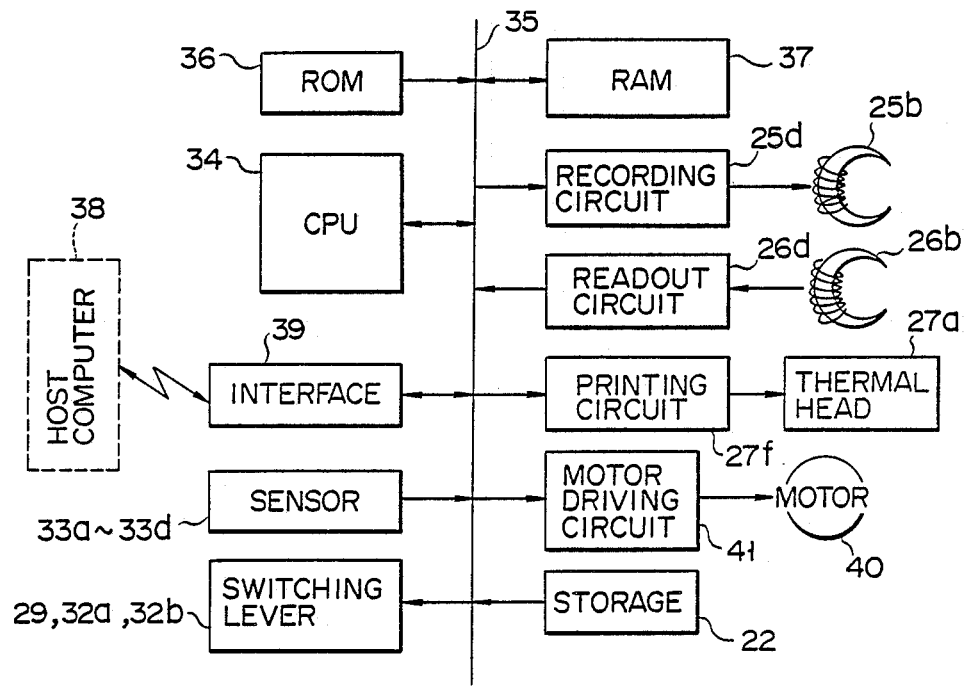
FIG. 3 is a block diagram of a control circuit used in the ticket issuing apparatus shown in FIG. 2.

FIG. 3 is a block diagram showing the control circuit for the ticket issuing apparatus. The control circuit includes CPU 34, bus line 35, ROM 37, and interface 39. CPU 34 is used to effect various processing operations. Central processing unit or CPU 34 is connected to interface 39, ROM 36 and RAM 37 via bus line 35. ROM 36 is used to store the control program for CPU 34, and RAM 37 is used to temporarily store various display data and input/output data for CPU 34. Interface 39 controls the data transfer between CPU 34 and host computer 38.

CPU 34 is further connected to data recording circuit 25d of data recording section 25, readout circuit 26d of data readout section 26, printing circuit 27f of printing section 27, motor driving circuit 41 of motor 40 for driving feed rollers 24a to 24c and feed-in roller 28, storage 22, switching levers 29, 32a, 32b and paper sensors 33a to 33d via bus line 35.

Figure 4:
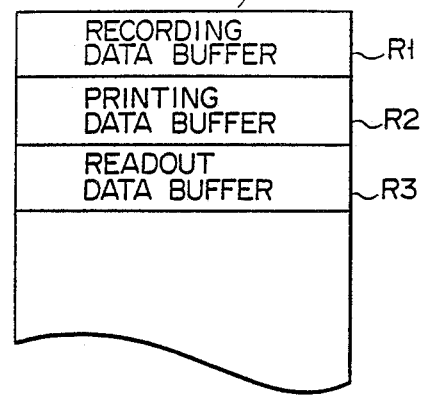
FIG. 4 shows the internal areas of a RAM shown in FIG. 3.
Figure 5:
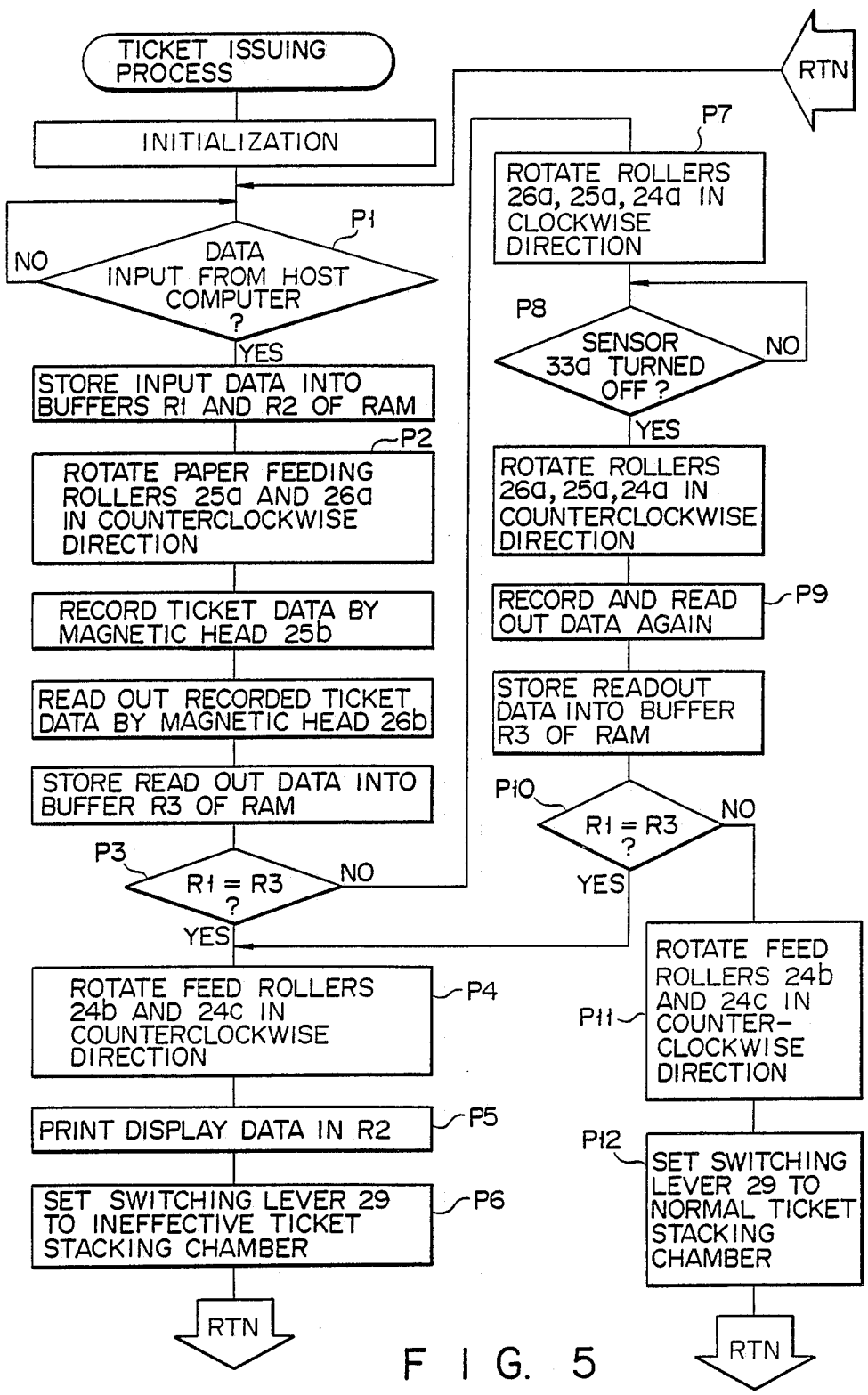
FIG. 5 is a flowchart for illustrating the operation of the ticket issuing apparatus shown in FIG. 2.

As shown in FIG. 4, RAM 37 has recording data buffer R1 and printing data buffer R2 for storing ticket data and display data supplied from host computer 38, and readout data buffer R3 for storing ticket data read out from paper 1 by means of data readout section 27.

In operation, sheets of paper 1 are set in storage 22, and the power source switch of the apparatus is turned on. Then, the control program is read out from ROM 36 and is executed by means of CPU 34. At this time, the process of issuing the ticket is effected according to the flowchart shown in FIG. 5. When the ticket issuance process is started, an initialization process is first effected. For example, in the initialization process, RAM 3 is cleared and switching levers 32a and 32b are set so as to prevent paper 1 from entering guides 23e and 23f. After this, CPU 34 waits for data input from host computer 38 in step P1. When it is detected in step P1 that ticket data and display data are input from host computer 38 via interface 39, the ticket data and display data are stored in recording data buffer R1 and printing data buffer R2 of RAM 37.

In step P2, feed roller 24a and paper feeding rollers 25a and 26a are rotated at a constant speed in a clockwise direction so as to feed paper 1 extracted from storage 22 to data recording section 25 and data readout section 26. Then, ticket data is transferred from recording data buffer R1 to magnetic head 25b of data recording section 25, and recorded on magnetic stripe 3 of paper 1. After this, the ticket data is read out from magnetic stripe 3 by means of magnetic head 26b of data readout section 26 and stored in readout data buffer R3 of RAM 37.

In step P3, it is checked whether or not the ticket data in readout data buffer R3 coincides with the ticket data in recording data buffer R1. If the coincidence between them is detected, feed rollers 24b and 24c are rotated in a counterclockwise direction to feed paper 1 to printing section 27 in step P4. Then, in step P5, thermal head 27a of printing section 27 is driven to print display data transferred from printing data buffer R2 on front surface 1a of paper 1. In step P6, switching lever 29 is rotated towards ineffective ticket stacking chamber 31 so as to close the paper inlet port of ineffective ticket stacking chamber 31 and opens the paper inlet port of normal ticket stacking chamber 30. Thus, correct ticket data may be recorded on magnetic stripe 3 and paper 1 having display data 2 printed on front surface 1a is stacked as a ticket in normal ticket stacking chamber 30.

In a case where it is detected in step P3 that data in readout data buffer R3 does not coincide with data recording data buffer R1, it is determined that the recording operation is effected erroneously. At this time, the operation of magnetic head 25b and 26b is interrupted in step P7. Further, switching lever 32a is driven to close guide 23a. Then, paper feeding rollers 26a, 25a and feed roller 24a are rotated in a clockwise direction to more paper 1 backwards via guides 23c and 23b. At this time, the end portion of paper 1 is temporarily inserted into guide 23e.

It is checked in step P8 whether position sensor 33a provided on guide 23b is turned off or not. Sensor 33a is turned off when paper 1 is moved back to a position in front of data recording section 25. When it is detected that sensor 33a is turned off, paper feeding rollers 26a, 25a and feed roller 24a are rotated in a counterclockwise direction to feed paper 1 to data recording section 25 and data readout section 26 again. Then, in step P9, data recording section 25 and data readout section 26 perform the data re-recording and re-readout operations with respect to magnetic stripe 3 of the same paper. The data thus read out is stored in readout data buffer R3.

In step 10, it is checked again whether or not the ticket data in readout data buffer R3 coincides with the ticket data in recording data buffer R1. If the coincidence between them is detected, it is determined that correct data is recorded on magnetic stripe 3, and steps P4, P5 and P6 are effected.

If it is detected in step P10 that the ticket data in buffers R1 and R3 do not coincide with each other, it is determined that paper 1 is an ineffective ticket. Then, feed rollers 24b and 24c are rotated in a counterclockwise direction in step P11 without operating thermal head 27a of printing section 27. Further, switching lever 29 is rotated towards normal ticket stacking chamber 30 to close the paper inlet port of normal ticket stacking chamber 30 and open the paper inlet port of ineffective ticket stacking chamber 31 in step P12. In this way, sheets of paper 1 which are determined to be ineffective tickets or incorrectly recorded tickets are stacked in ineffective ticket stacking chamber 31 without printing data on front surface 1a thereof.

With the ticket issuing apparatus of the above construction, sheets of paper 1 each having magnetic stripe 3 formed on back surface 1b are set in storage 22 and then the ticket issuing apparatus is activated. When ticket data and display data are input from external host computer 38, a sheet of paper is extracted from storage 22 and fed along the feeding path constructed by the guides. Data recording section 25 records ticket data on magnetic stripe 3 and data readout section 26 reads out the recorded ticket data to check whether the readout data is correct or not. If it is detected that the ticket data is correct, printing section 27 prints display data on front surface 1a. In this case, paper 1 is stacked as a normal ticket in stacking chamber 30.

Further, if the recorded ticket data is detected to be incorrect by means of data readout section 26, paper 1 is moved back along the feeding path to a position in front of data recording section 25, and the same data is recorded the magnetic stripe again. Then, if the ticket data recorded this time is detected to be correct by means of data readout section 26, printing section 27 prints display data on the paper, and the paper is stacked as a normal ticket in stacking chamber 30.

However, if the ticket data recorded for the second time is detected to be incorrect, the paper is stacked as an ineffective ticket in stacking chamber 31 without printing display data on the paper.

As described above, since the possibility that the correct ticket data can be obtained is high, that is, incorrectly recorded data can probably be replaced by correct data if the data recording operation is effected again with respect to the incorrectly recorded ticket, then the total number of sheets of paper which cannot be effectively used is significantly reduced. Thus, it becomes possible to efficiently use the ticket paper.

What is claimed is:

1. A ticket issuing apparatus comprising:
    a feeding path for sheets of ticket paper on which magnetic stripes are respectively formed;
    a feeding mechanism for feeding the ticket paper along said feeding path;
    a recording section provided on said feeding path for recording ticket data on the magnetic stripe of the ticket paper;
    a readout section provided on said feeding path for reading out the ticket data from the magnetic stripe of the ticket paper which has passed said recording section;
    a printing section provided on said feeding path for printing display data on the ticket paper; and
    ticket evaluation means for checking the ticket data read out by said readout section, causing said feeding mechanism to feed the ticket paper back to said recording section when the ticket data is detected to be erroneously recorded, checking the ticket data which has been recorded again and read out by said readout section, and determining the ticket paper as an ineffective ticket when the ticket data is detected to be erroneously recorded again.

2. A ticket issuing apparatus according to claim 1, wherein said ticket evaluation means is constructed to inhibit said printing section from printing the display data on the ticket paper determined as the ineffective ticket.

3. A ticket issuing apparatus according to claim 2, wherein said feeding path includes a paper guide for temporarily receiving part of said ticket paper when it is fed back to said recording section.

4. A ticket issuing apparatus according to claim 3, wherein said ticket evaluation means includes a paper sensor provided on the feeding path between said reading section and printing section for detecting the ticket paper.

5. A ticket issuing apparatus according to claim 4, wherein said readout section is provided between said recording section and printing section.

6. A ticket issuing apparatus according to claim 5, which further includes paper storing means for storing sheets of the ticket paper and supplying them to said recording section one by one.

7. A ticket issuing apparatus according to claim 6, wherein said feeding section includes a paper guide for receiving a sheet of the ticket paper manually supplied from outside to deliver the ticket paper to aid recording section.

* * * * *

UNITED STATES PATENT AND TRADEMARK OFFICE
CERTIFICATE OF CORRECTION

PATENT NO. : 4,965,438
DATED : October 23, 1990
INVENTOR(S) : Harutoshi MUROFUSHI It is certified that error appears in the above-identified patent and that said Letters Patent is hereby corrected as shown below:

Title page, Section [56] References Cited:

Change U.S. Patent --

"3,984,600" to --3,984,660--.

Signed and Sealed this

Sixth Day of October, 1992

*Attest:*

DOUGLAS B. COMER

*Attesting Officer*  *Acting Commissioner of Patents and Trademarks*